Patented Aug. 21, 1934

1,970,649

UNITED STATES PATENT OFFICE 1,970,649

PROCESS FOR THE MANUFACTURE OF ODORLESS PHENOL - FORMALDEHYDE RESIN

Earl S. Edwards, Pennington, N. J., assignor to Panelyte Corporation, Trenton, N. J., a corporation of New Jersey No Drawing. Application March 4, 1932, Serial No. 596,897

2 Claims. (Cl. 260—4)

This invention relates to improvements in processes for manufacturing resins and has more particular relation to processes for manufacturing odorless phenol formaldehyde resins.

One of the principal objects of the invention is to provide a phenol formaldehyde resin which is practically odorless so that it may be used for the interior of refrigerators and the like.

Another object of the invention is the use in a phenol formaldehyde solution of cresylic acid in such proportions as to leave practically no cresylic acid residue after the reaction.

A further object of the invention is to provide a large excess of formaldehyde combined with cresylic acid and sodium hydroxide or other catalysts.

The invention also has other objects, all of which will be hereinafter more particularly set forth and claimed.

The manufacture of a condensation product of phenol or cresols and formaldehyde is not new. These processes usually consist of reacting equimolecular proportions of phenol and cresols with formaldehyde or formaldehyde derivatives, the reaction being usually brought about by heat and the addition of various acids or bases which act as catalytic agents to stimulate the reaction. This reaction is usually carried on in a steam jacketed kettle either under vacuum or if desired at atmospheric pressure and either with or without a reflux condenser.

The usual practice when using formaldehyde is to add a slight excess over equimolecular proportions to compensate for the loss of formaldehyde in the reaction and distillation. When this process is employed, there is always present in the finished product certain constituents that are odor bearing and which give off the characteristics of phenol or carbolic acid odor, and render such products unfit for any use where the odors or flavors can be absorbed. This fact makes it impossible to use such type of material in refrigerators or other closed containers in which food is stored.

Under the present practice, an insulating material of pleasing appearance and resistant to water, acids and other solvents is very desirable, and for this reason the present invention contemplates the provision of a phenol formaldehyde resin which does not have the residual phenol odor.

With the process of the present invention, it is entirely practicable to manufacture and control an odorless product, and this product by long research and test has proven very satisfactory for use in food storage containers without suspicion of contamination to the foodstuffs such as butter or milk or other common food-stuffs which are usually contaminated by odoriferous materials.

As the phenol formaldehyde resin is the base of all moulded articles or boards, strips or the like made from such material as impregnated paper or fabrics or other fibrous material, the herein described method of manufacture has resulted in a greatly improved article of manufacture which may be manufactured by the usual method of moulding or laminations and secure a finished product devoid of all odors. In carrying out this method, either phenol or cresols may be employed and the quantities preferred are as follows:—An equal quantity by volume of formaldehyde 40% solution and crude cresylic acid have been found to work satisfactorily. A rapid reaction of this combination is assured by the addition of a strong catalyst such as sodium hydroxide. Such addition of sodium hydroxide causes the cresylic acid to react very quickly with the formaldehyde, leaving no excess of cresylic acid, and still leaving a large excess of formaldehyde with some water. Other catalysts such as mineral or organic acids may be substituted for sodium hydroxide and the quantity adjusted so as to cause a rapid reaction which is necessary. An example of the proportions which have been developed is as follows:

100 gallons of cresylic acid
100 gallons of U. S. P. 40% formaldehyde
3,000 grams of caustic soda.

These are all placed in a steam jacketed kettle equipped with an agitator or mechanical stirring device and the contents heated by steam (25 lbs. to 50 lbs. pressure) during the stirring. The initial ebullition or boiling will occur after about 5 to 10 minutes and the steam is then turned off. A violent reaction occurs and the vapors of water and formaldehyde are discharged from the kettle by an exhaust fan pipe inlet through the top of the kettle. The reaction is completed at the end of about 20 minutes when a color change is noticed in the solution. A solvent such as alcohol or a mixture of alcohol and benzol is then added to the mixture. This serves to dissolve the resin and arrests the reaction.

It has been found by experiment that crude cresylic acid of the cheaper grade may be used satisfactorily for the above product, and this together with the quick reaction period and the elimination of a reflux condenser and vacuum equipment, enables the material to be produced at a very low cost, and in a finely finished condition in which the very objectionable odor of phenol or cresylic acid has been entirely eliminated.

It will also be understood that the objections to phenol formaldehyde structures because of the odor of the phenol or other equivalent, are of extreme importance as it has precluded the use of this material in many structures such as refrigerators or other food storage cabinets where otherwise it would have been very desirable to employ it. The objection not only holds good in the employment of the finished product but also holds good in the working of the phenol formaldehyde moulds or boards as any machine operations, boring or the like on the finished product has always been accompanied by the release of the very objectionable odors because of the heat produced by the machine operations. These odors have been so pronounced at times as to sicken the operators as the vapors being inhaled by the operators have reacted on the membranes of the nasal passages and the throat disastrously.

What I claim is:

1. The process of manufacturing a substantially odorless phenol-formaldehyde resinous insulating material, which consists in mixing a substantially 40% solution of formaldehyde with a substantially equal volume of crude cresylic acid, adding to this solution a quantity of sodium hydroxide operating as a catalyst, heating the catalyzed solution to a temperature sufficient to cause violent reaction between the formaldehyde and cresylic acid, removing the acid fumes released during this reaction, and adding an alcohol to the solution upon change of color thereof to stop the reaction.

2. The process of manufacturing a substantially odorless phenol-formaldehyde resinous insulating material, which consists in mixing a substantially 40% solution of formaldehyde with a substantially equal volume of crude cresylic acid, adding to this solution a quantity of sodium hydroxide operating as a catalyst, heating the catalyzed solution to a temperature sufficient to cause violent reaction between the formaldehyde and cresylic acid, removing the acid fumes released during this reaction, and adding a resin solvent to the solution upon change of color thereof to stop the reaction.

EARL S. EDWARDS.